US008761808B2

United States Patent
Hickey

(10) Patent No.: US 8,761,808 B2
(45) Date of Patent: Jun. 24, 2014

(54) APPARATUS AND METHOD FOR LOCATING A MOBILE TELECOMMUNICATION DEVICE

(75) Inventor: John D. Hickey, Boulder, CO (US)

(73) Assignee: West Corporation, Omaha, NE (US)

( * ) Notice: Subject to any disclaimer, the term of this patent is extended or adjusted under 35 U.S.C. 154(b) by 1401 days.

(21) Appl. No.: 12/020,669

(22) Filed: Jan. 28, 2008

(65) Prior Publication Data

US 2009/0191900 A1    Jul. 30, 2009

(51) Int. Cl.
*H04W 24/00* (2009.01)
*H04M 3/42* (2006.01)

(52) U.S. Cl.
USPC ............ 455/456.6; 455/404.2; 455/414.1; 455/414.2; 455/414.3; 455/414.4; 455/456.1; 455/456.2; 455/456.3; 455/457; 340/10.1

(58) Field of Classification Search
USPC .......... 455/404.2, 414.1–414.4, 456.1–456.6, 455/457, 556.1; 340/10.1–10.6
See application file for complete search history.

(56) References Cited

U.S. PATENT DOCUMENTS

| | | | | |
|---|---|---|---|---|
| 5,327,144 A * | 7/1994 | Stilp et al. | ............. | 342/387 |
| 5,542,100 A * | 7/1996 | Hatakeyama | ............. | 455/404.2 |
| 6,771,981 B1 | 8/2004 | Zalewski et al. | | |
| 7,079,832 B2 | 7/2006 | Zalewski et al. | | |
| 7,194,238 B2 | 3/2007 | Virtanen | | |
| 7,254,223 B1 | 8/2007 | Henderson | | |
| 2003/0036391 A1* | 2/2003 | Jordan | ............. | 455/456 |
| 2006/0086786 A1 | 4/2006 | Spencer, II | | |
| 2006/0109811 A1* | 5/2006 | Schotten et al. | ............. | 370/328 |
| 2007/0008129 A1* | 1/2007 | Soliman | ............. | 340/572.1 |
| 2007/0130279 A1* | 6/2007 | Thacher | ............. | 709/208 |
| 2007/0141997 A1 | 6/2007 | Wulff et al. | | |

* cited by examiner

*Primary Examiner* — Jinsong Hu
*Assistant Examiner* — Dung Hong

(57) ABSTRACT

An apparatus for indicating location of a mobile telecommunication device includes: a transmitting unit; and a fixing structure supporting the transmitting unit. The fixing structure effects removable affixation between the fixing structure and the mobile communication device. The transmitting unit effects communications with a communication network.

2 Claims, 4 Drawing Sheets

US 8,761,808 B2

APPARATUS AND METHOD FOR LOCATING A MOBILE TELECOMMUNICATION DEVICE

FIELD OF THE INVENTION

The present invention is directed to communication systems, and especially to locating mobile communication devices within a communication system.

BACKGROUND OF THE INVENTION

Systems for locating a communication device within a communication system nowadays involve some sort of application running on the communication device itself, such as a mobile phone.

Such equipping of a mobile communication device requires, by way of example and not by way of limitation, cooperation among mobile communicate device manufacturers and telecommunication system service providers (sometimes referred to as "carriers"). Sometimes cooperation by the Federal Communications Commission (FCC) may also be necessary. Cooperation among such a number and variety of agencies can be difficult, time consuming and expensive to carry out.

There is a need for an apparatus and method for locating a mobile communication device that can be easily implemented.

There is a need for an apparatus and method for locating a mobile communication device that can be unilaterally implemented and maintained without requiring inter-agency cooperation.

SUMMARY OF THE INVENTION

An apparatus for indicating location of a mobile telecommunication device includes: a transmitting unit; and a fixing structure supporting the transmitting unit. The fixing structure effects removable affixation between the fixing structure and the mobile communication device. The transmitting unit effects communications with a communication network.

A method for indicating location of a mobile telecommunication device includes: (a) in no particular order: (1) providing a transmitting unit; and (2) providing a fixing structure; (b) effecting a removable affixed relation between the fixing structure and the transmitting unit; and (c) operating the transmitting unit to effect communication with a communication network.

It is, therefore a feature of the present invention to provide an apparatus and method for locating a mobile communication device that can be easily implemented.

It is another feature of the present invention to provide an apparatus and method for locating a mobile communication device that can be unilaterally implemented and maintained without requiring inter-agency cooperation.

Further features of the present invention will be apparent from the following specification and claims when considered in connection with the accompanying drawings, in which like elements are labeled using like reference numerals in the various figures, illustrating the preferred embodiments of the invention.

DETAILED DESCRIPTION

For purposes of illustration, by way of example and not by way of limitation, the present invention will be discussed in the context of an emergency service network in the United States, commonly referred to as an E9-1-1 network. The teachings of the present invention are equally applicable, useful and novel in other calling systems, including other special number calling systems such as maintenance service networks, college campus security networks and other networks.

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

When the terms "coupled" and "connected", along with their derivatives, are used herein, it should be understood that these terms are not intended as synonyms for each other. Rather, in particular embodiments, "connected" is used to indicate that two or more elements are in direct physical or electrical contact with each other. "Coupled" is used to indicated that two or more elements are in either direct or indirect (with other intervening elements between them) physical or electrical contact with each other, or that the two or more elements co-operate or interact with each other (e.g., as in a cause-and-effect relationship).

Figure 1:
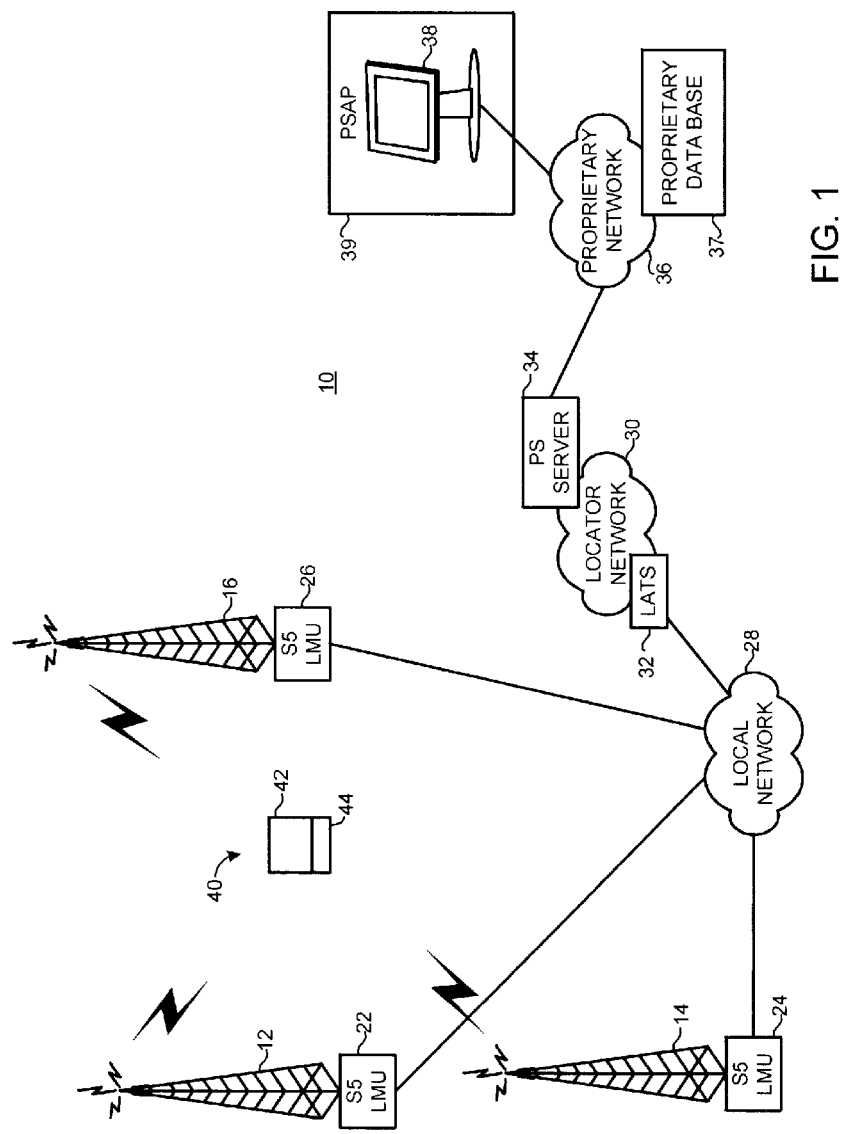
FIG. 1 is a schematic diagram of a communication system configured for locating a respective communication device.

FIG. 1 is a schematic diagram of a communication system configured for locating a respective communication device. In FIG. 1, a communication system 10 includes antennas 12, 14, 16. Each respective antenna 12, 14, 16 is coupled with an associated Location Measurement Unit (LMU) so that antenna 12 is coupled with LMU 22, antenna 14 is coupled with LMU 24 and antenna 16 is coupled with LMU 26.

LMUs 22, 24, 26 are coupled with a local network 28. By way of example and not by way of limitation, local network 28 may be embodied in an Internet Protocol (IP) network. Network 28 is coupled with a locator network 30 via a Location and Telemetry Server (LATS) 32. Locator network 30 may also be coupled, by way of example and not by way of limitation, via a Public Service (PS) server 34 with a proprietary network 36 for handling, by way of example and not by way of limitation, emergency 9-1-1 calls seeking an emergency service response. Proprietary network 36 may be accessed by a system (details not shown in FIG. 1) and displayed on a monitor 38 located at an answering position, such as a Public Safety Answering Point (PSAP; sometimes referred to as a Public Safety Answering Position) 39 via proprietary network 36.

A mobile communication device 40 may include a communication unit 42 with an attached locating unit 44. Locating unit 44 is preferably an independent stand-alone unit having its own power source (not shown in detail in FIG. 1;

understood by one skilled in the art of mobile communication device design) and operating independently of communication unit 42.

By way of example and not by way of limitation, locating unit 44 may be embodied in a Radio Frequency Identification (RFID) device similar to an S5 device offered by S5 Wireless Corporation of Draper, Utah. Locating unit 44 may continuously transmit a coded message indicating identity of communication unit 42. Alternatively, locating unit 44 may intermittently transmit such a coded message. Another alternative may provide for signals from antennas 12, 14, 16 to effect an interrogation of locating unit 44 and locating unit 44 transmitting a response coded message identifying communication unit 42. Other interactive arrangements or combinations of arrangements between locating unit 44 and antennas 12, 14, 16 providing for wireless identification of communication unit 42 may also be employed.

Each of antennas 12, 14, 16 cooperates with a respective LMU 22, 24, 26 to contribute information regarding location of communication unit 42 to LATS 32 via local network 28. LATS 32 employs location information received from LMUs 22, 24, 26 to determine a determined location for communication unit 42. The determined location is provided via PS server 34 and proprietary network 36 to a proprietary data base 37. Proprietary data base 37 may be accessed by a user at monitor 38 located at an answering position, such as PSAP 39, via proprietary network 36.

Locating unit 44 may be, by way of example and not by way of limitation, incorporated in an accessory associated with communication unit 42. A consumer may purchase at a retail outlet such an accessory for a communication unit 42 having an incorporated locating unit 44. The consumer may activate or provision a locating service capability by, for example, subscribing to a service associated with proprietary network 36. By way of example and not by way of limitation, the location service may be embodied in a service facility, such as a private call center operated by Intrado, Inc., of Longmont, Colo. Private call centers may be employed to ensure that emergency calls placed by subscribers are accurately and reliably delivered to the correct PSAP 39 for handling the emergency being reported.

The price of the accessory incorporating locating unit 44 may, by way of example and not by way of limitation, include the cost of an RFID device embodying locating unit 44, and may also include the cost of subscribing to a locating service for a predetermined period, such as three or four years. When a subscriber uses mobile communication unit 42 to place an emergency 9-1-1 call, a PSAP 39 to which the call is routed may access the information stored in a subscriber registry in proprietary data base 37 via proprietary network 36. Proprietary data base 37 may obtain location information relating to mobile communication unit 42 if locating unit 44 is a registered subscribing unit. The X,Y position of locating unit 44 will be provided to the inquiring PSAP 39, such as at monitor 38. Other geographic location indicating information may be provided such as, by way of example and not by way of limitation, latitude—longitude indication, Global Positioning System (GPS) coordinates or other location indicating information. Multiple accesses into proprietary data base 37 may be employed to determine direction and speed of movement by locating unit 44.

Location information generated for locating unit 44 can be accurate enough to permit conversion into an address or a map for use by emergency responders. Location information for an emergency service caller associated with locating unit 44 can permit assuring the responsibility for responding to the call will be routed to the closest PSAP 39 for action. System 10 is not dependent on any mobile communication service carrier, and subscriptions to the locating service can be sold directly to a consumer by either a mobile communication service carrier or by a locating service provider.

Figure 2:
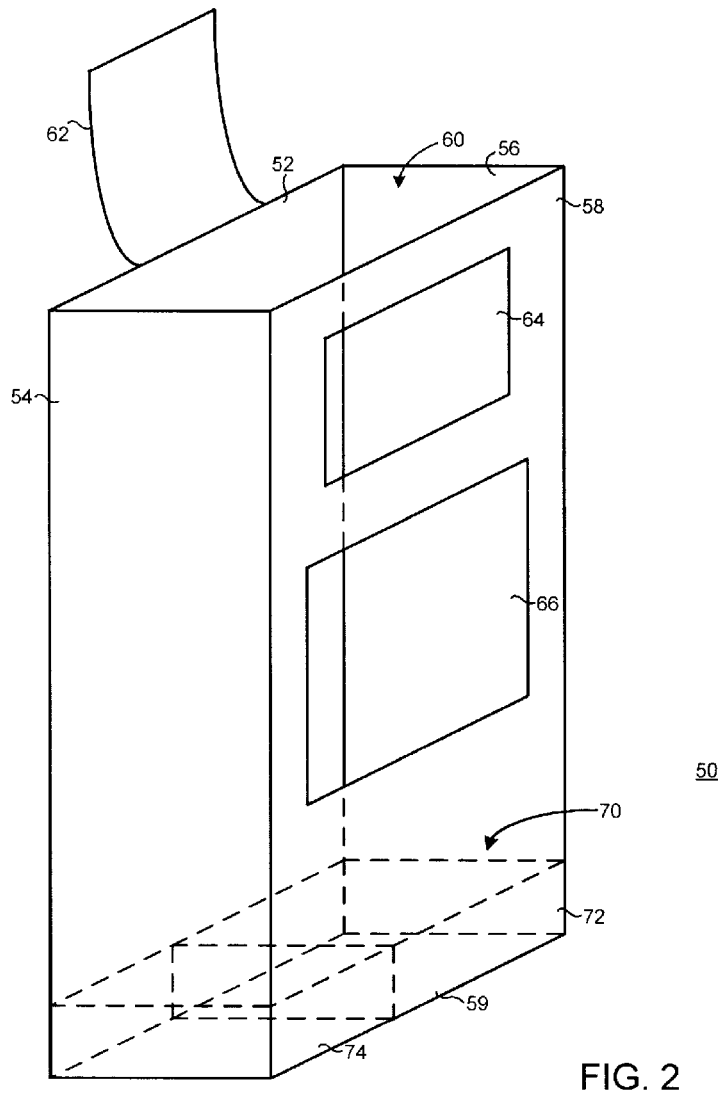
FIG. 2 is a schematic diagram illustrating a first embodiment of an apparatus for locating a mobile communication device.

FIG. 2 is a schematic diagram illustrating a first embodiment of an apparatus for locating a mobile communication device. In FIG. 2, an accessory for a mobile communication unit such as a mobile phone is embodied in a carrying case 50. Carrying case 50 includes a back partition 52, side partitions 54, 56, a front partition 58 and a bottom partition 59. Partitions 52, 54, 56, 58, 59 cooperate to establish an interior space 60 proportioned for receiving a mobile communication unit, such as a mobile phone (not shown in FIG. 2). A securing strap 62 is configured to span interior space and attach partitions 52, 58 for securing a mobile communication unit within interior space 60. Securing strap 62 may be flexible attached with partition 52 to permit strap 62 to be held away from interior space 60 while inserting a mobile communication unit within interior space 6(0. After inserting a mobile communication unit within interior space 60, strap 62 may be oriented to span interior space 60 and attach with partition 58. Attachment may be effected suing any of several attaching structures (not shown in detail in FIG. 2; understood by those skilled in the art of mobile phone accessory design) such as, by way of example and not by way of limitation, miniature hook-and-eye fasteners, snap fasteners or other fastening structures.

Partition 58 has apertures 64, 66 to permit a user to view or access predetermined portions of an inserted mobile communication unit, such as, by way of example and not by way of limitation, actuation keys, operational controls and similar portions of an inserted mobile communication unit.

Other structures besides strap 62 may also be employed for securing a mobile communication unit within interior space 60, and other partitions than the top portion of carrying case 50 may be configured for accommodating insertion of a mobile communication unit within carrying case 50. The particular design of carrying case 50 is not a part of the present invention.

Included with carrying case 50 is an integral locating unit 70. Locating unit 70 includes a locating element 72 and a power supply unit 74. Power supply unit 74 may be embodied in, by way of example and not by way of limitation, a battery unit, a solar power unit, a hand-powered motor generator unit or another power supply unit that is independent of any power unit associated with operation of a mobile communication unit inserted within carrying case 50.

Locating element 72 may be embodied in a Radio Frequency Identification (RFID) device similar to an S5 device offered by S5 Wireless Corporation of Draper, Utah. Locating element 72 may continuously transmit a coded message indicating identity of locating element 72. Alternatively, locating element 72 may intermittently transmit such a coded message. Another alternative may provide for signals from antennas (e.g., antennas 12, 14, 16; FIG. 1) to effect an interrogation of locating element 72, and locating element 72 transmitting a response coded message identifying locating element 72. Other interactive arrangements or combinations of arrangements between locating element 72 and associated antennas providing for wireless identification of locating element 72 may also be employed.

Figure 3:
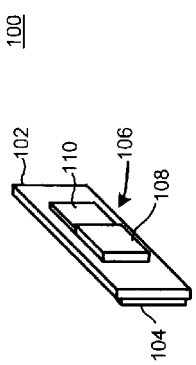
FIG. 3 is a schematic diagram illustrating a second embodiment of an apparatus for locating a mobile communication device.

FIG. 3 is a schematic diagram illustrating a second embodiment of an apparatus for locating a mobile communication device. In FIG. 3, an accessory for a mobile communication unit such as a mobile phone is embodied in a lanyard unit 80. Lanyard unit 80 includes a cord portion 82 (shown in part in FIG. 3; understood by those skilled in the art of mobile phone accessory design). Cord portion 82 is coupled with a body portion 84. Body portion 84 is coupled with an attachment portion 86. Attachment portion 86 is illustrated in FIG. 3 as including a threaded post 87 configured for threaded engagement with a threaded socket provided in a mobile communication unit (not shown in FIG. 3; understood by those skilled in the art of mobile phone accessory design) for securing threaded post 87 with the mobile communication unit.

Included with lanyard unit 80, preferably embedded within or attached with body portion 84 is an integral locating unit 90. Locating unit 90 includes a locating element 92 and a power supply unit 94. Power supply unit 94 may be embodied in, by way of example and not by way of limitation, a battery unit, a solar power unit or another power supply unit that is independent of any power unit associated with operation of a mobile communication unit used with lanyard unit 80.

Locating element 92 may be embodied in a Radio Frequency Identification (RFID) device similar to an S5 device offered by S5 Wireless Corporation of Draper, Utah. Locating element 92 may continuously transmit a coded message indicating identity of locating element 92. Alternatively, locating element 92 may intermittently transmit such a coded message. Another alternative may provide for signals from antennas (e.g., antennas 12, 14, 16; FIG. 1) to effect an interrogation of locating element 92, and locating element 92 transmitting a response coded message identifying locating element 92. Other interactive arrangements or combinations of arrangements between locating element 92 and associated antennas providing for wireless identification of locating element 92 may also be employed.

Figure 4:
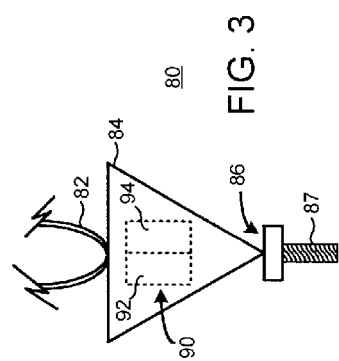
FIG. 4 is a schematic diagram illustrating a third embodiment of an apparatus for locating a mobile communication device.

FIG. 4 is a schematic diagram illustrating a third embodiment of an apparatus for locating a mobile communication device. In FIG. 4, an accessory for a mobile communication unit such as a mobile phone is embodied in a stand-alone unit 100. Stand-alone unit 100 includes a base portion 102 supporting an attachment portion 104. Attachment portion 104 may be embodied, by way of example and not by way of imitation, in a two-sided adhesive patch adhered with base portion and presenting an adhesive face away from base portion 102 for effecting adherence with a surface. Base portion 102 also supports a locating unit 106. Locating unit 106 includes a locating element 108 and a power supply unit 110. Power supply unit 110 may be embodied in, by way of example and not by way of limitation, a battery unit, a solar power unit or another power supply unit that is independent of any power unit associated with operation of a mobile communication unit with which stand-alone unit 100 may be employed.

Locating element 108 may be embodied in a Radio Frequency Identification (RFID) device similar to an S5 device offered by S5 Wireless Corporation of Draper, Utah. Locating element 108 may continuously transmit a coded message indicating identity of locating element 108. Alternatively, locating element 108 may intermittently transmit such a coded message. Another alternative may provide for signals from antennas (e.g., antennas 12, 14, 16; FIG. 1) to effect an interrogation of locating element 108, and locating element 108 transmitting a response coded message identifying locating element 108. Other interactive arrangements or combinations of arrangements between locating element 108 and associated antennas providing for wireless identification of locating element 108 may also be employed.

The surface to which stand-alone unit 100 may be adhesively mounted may be a mobile communication unit, an accessory such as a carrying case, or another accessory accompanying the mobile communication unit when in use. In a properly designed mobile communication device, stand-alone unit 100 may be mounted internally of the mobile communication unit such as, by way of example and not by way of limitation, inside of a battery compartment. If desired, locating unit 106 and attachment structure 104 may be supported on the same side of base portion 102.

Figure 5:
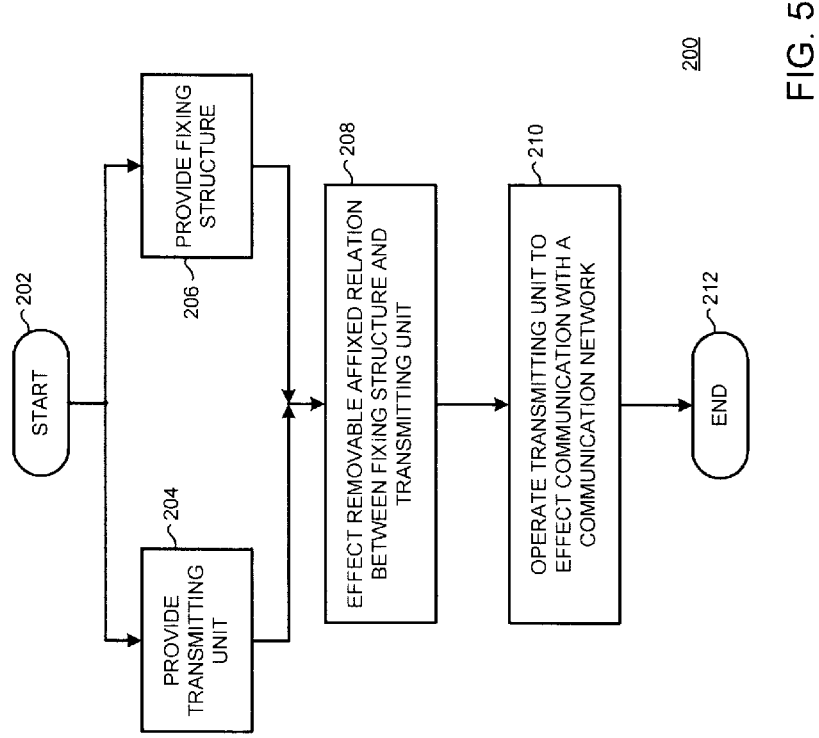
FIG. 5 is a flow diagram illustrating a method for locating a mobile communication device.

FIG. 5 is a flow diagram illustrating a method for locating a mobile communication device. In FIG. 5, a method 200 for indicating location of a mobile telecommunication device begins at a START locus 202. Method 200 continues with, in no particular order: (1) providing a transmitting unit, as indicated by a block 204; and (2) providing a fixing structure, as indicated by a block 206.

Method 200 continues with effecting a removable affixed relation between the fixing structure and the transmitting unit, as indicated by a block 208.

Method 200 continues with operating the transmitting unit to effect communication with a communication network, as indicated by a block 210. Method 200 terminates at an END locus 212.

It is to be understood that, while the detailed drawings and specific examples given describe embodiments of the invention, they are for the purpose of illustration only, that the system and method of the invention are not limited to the precise details and conditions disclosed and that various changes may be made therein without departing from the spirit of the invention which is defined by the following claims:

The invention claimed is:

1. An apparatus for providing location information relating to a mobile telecommunication device and making said location information available to a called party; the apparatus comprising:
   (a) a locating unit; said locating unit including a communicating unit coupled with a power source unit; said communicating unit responding to an intermittently received inquiry signal;
   (b) a support unit supporting said locating unit; and
   (c) a fixing structure; said fixing structure effecting removable affixation between said support unit and said mobile communication device;
   said locating unit being configured for effecting one-way communication with at least one locator network independent of a telecommunication network providing telecommunication service for said mobile communication device; said locating unit cooperating with said at least one locator network to ascertain location of said locating unit with said mobile communication device; said at least one locator telecommunication network providing delivered location information relating to said mobile communication device to a database; said database being located remotely from said mobile telecommunication device; said database saving said delivered location information as stored location information; said database being accessible by said called party for obtaining said stored location information.

2. An apparatus for providing location information relating to a mobile telecommunication device and making said location information available to a called party; the apparatus comprising:
   (a) a transmitting unit; said transmitting unit including a communicating unit coupled with a power source unit; said communicating unit responding to an intermittently received inquiry signal; and
   (b) a fixing structure supporting said transmitting unit; said fixing structure being configured for effecting removable affixation between said fixing structure and an affixed said mobile communication device;

said transmitting unit effecting one-way communications with at least one communication network independent of a telecommunication network providing telecommunication service for said mobile telecommunication device; said transmitting unit and said at least one communication network cooperating to ascertain location of said transmitting unit; said at least one communication network providing delivered location information relating to said transmitting unit and an affixed said mobile communication device to a database; said database being located remotely from said mobile telecommunication device; said database retaining said delivered location information as stored location information; said called party accessing said database for obtaining said stored location information.

\* \* \* \* \*